United States Patent [19]

Clemens et al.

[11] 4,158,842
[45] Jun. 19, 1979

[54] RADAR TYPE FUZES

[75] Inventors: John E. Clemens, Xenia, Ohio; Thomas C. Stephens; Albert E. Dilz, both of Richmond, Ind.; James A. Hewlett, Cincinnati, Ohio

[73] Assignee: Avco Corporation, Cincinnati, Ohio

[21] Appl. No.: 444,948

[22] Filed: Mar. 31, 1965

[51] Int. Cl.² ............................................. F42C 13/04
[52] U.S. Cl. .................................. 343/7 PF; 343/18 E
[58] Field of Search ...................... 343/7 PF, 14, 17.1, 343/8, 18 E; 102/70.2, 70.2 P

[56] References Cited

U.S. PATENT DOCUMENTS

| 3,913,104 | 10/1975 | Adrian et al. | 343/7 PF |
| 3,985,080 | 10/1976 | Kostecki | 343/7 PF X |

Primary Examiner—T. H. Tubbesing
Attorney, Agent, or Firm—Alden D. Redfield; Charles M. Hogan

EXEMPLARY CLAIM

1. In a target-approaching doppler radar of the type including means for generating radio frequency signals and supplying local oscillations, means for generating random noise bursts, modulator means, means for mixing said local oscillations with echo signals, a doppler amplifying channel, and means for controlling the sensitivity of said channel, the improvement which comprises, in combination:

a video delay network interposed between the noise burst signal generating means and the modulator means for effectively forming each burst into a sequence of bursts of like character and the successive bursts into successive sequences, thereby providing several opportunities for correlation at radio frequencies;

and means for taking advantage of a later opportunity for correlation if at any point in the approach to the target barrage-type false jamming signals are present, the last-mentioned means comprising:

filter means in the doppler signal amplifying channel for dividing the doppler signal spectrum down into a plurality of segments large in number with respect to the number of adjacent segments into which a true doppler signal falls;

and signal analyzer means having a like plurality of inputs coupled to said filter means, said signal analyzer means being formed to determine whether signals applied to it are true doppler signals falling within said small number of segments or barrage-type false jamming signals spanning a larger number, and said signal analyzer including an output coupled to said doppler-channel sensitivity control means whereby to cause the control means to desensitize the doppler amplifying channel in the event that the signal analyzer decides that a jamming signal is present.

15 Claims, 13 Drawing Figures

RADAR TYPE FUZES

The present invention relates to an improved system of circuits and methods for electronically rendering a radar fuze substantially immune to extraneous artificial interference or false-signal jamming.

The increase in the terminal velocity of the reentry vehicle of certain missiles to multi-Mach values, the possibility of extensive directional maneuvering during reentry, and the growing effectiveness of countermeasures make mandatory substantial improvements in the fuzing of reentry vehicles. The invention is directed to improvements in radar fuzing for reasons now stated.

When high altitude burst is based on a measurement of deceleration during reentry, this introduces a requirement for a preset timer to fire the warhead. Preset timing tends to become inaccurate when the warhead is slowly decelerated or maneuvered. Bursts initiated by air pressure become erratic and impractical above Mach 1. Inertial devices which integrate vertical components of deceleration are cumbersome and unreliable. Impact fuzing at great terminal velocities may not accomplish firing before mechanical crushing of the warhead. These considerations lead to increased emphasis on radar type fuzing, which has heretofore been considered to be vulnerable to enemy countermeasures.

It is the object of this disclosure to propose a radar type fuze which will resist massive countermeasures and provide accurate and reliable fuzing.

Experience in ordnance and missilery indicates that it is desirable to delay arming of a radar fuze for as long a time as practical, in order to minimize the enemy's opportunity to analyze the radar signals. A deceleration sensor or similar device delays the arming of the fuze, including the transmission of the radar signal, but under no circumstances does it occur below the planned height of the burst. Accordingly, while the general objects of this invention are to improve fuzing in such a manner as to provide resistance against massive countermeasures, a specific object of the invention is to provide a system which, while it delays arming as much as possible to deny the enemy adequate time for analysis of the radar signals, operates in such a way that the present of massive electronic countermeasures simply temporarily desensitizes the fuze and delays the firing until a time when the burst is certain to be effective.

Field experience has further shown that fuzing radiations should avoid repetitive characteristics vulnerable to perception and analysis in order to minimize the danger of disclosing the operational characteristics of the fuze.

Another fundamental object of the invention is, therefore, to provide a fuze which complies with these desirable requirements.

It is also an object of the invention to provide improvements in radar fuzing which impart to such fuzing a new and higher order of discrimination against spurious or false signals.

A further object of the invention is to provide improved electronic circuits for a radar fuze which exploit decision detection in such a manner that the presence of massive jamming not only fails to "premature" the fuze but simply temporarily desensitizes it as indicated above.

Still another object of the invention is to provide a doppler type radar fuzing system which correlates at radio frequencies but utilizes video frequency delay means, thereby allowing for high altitude correlation and rendering less rigorous the voltage-frequency characteristic of the transmitter.

Figure 1:
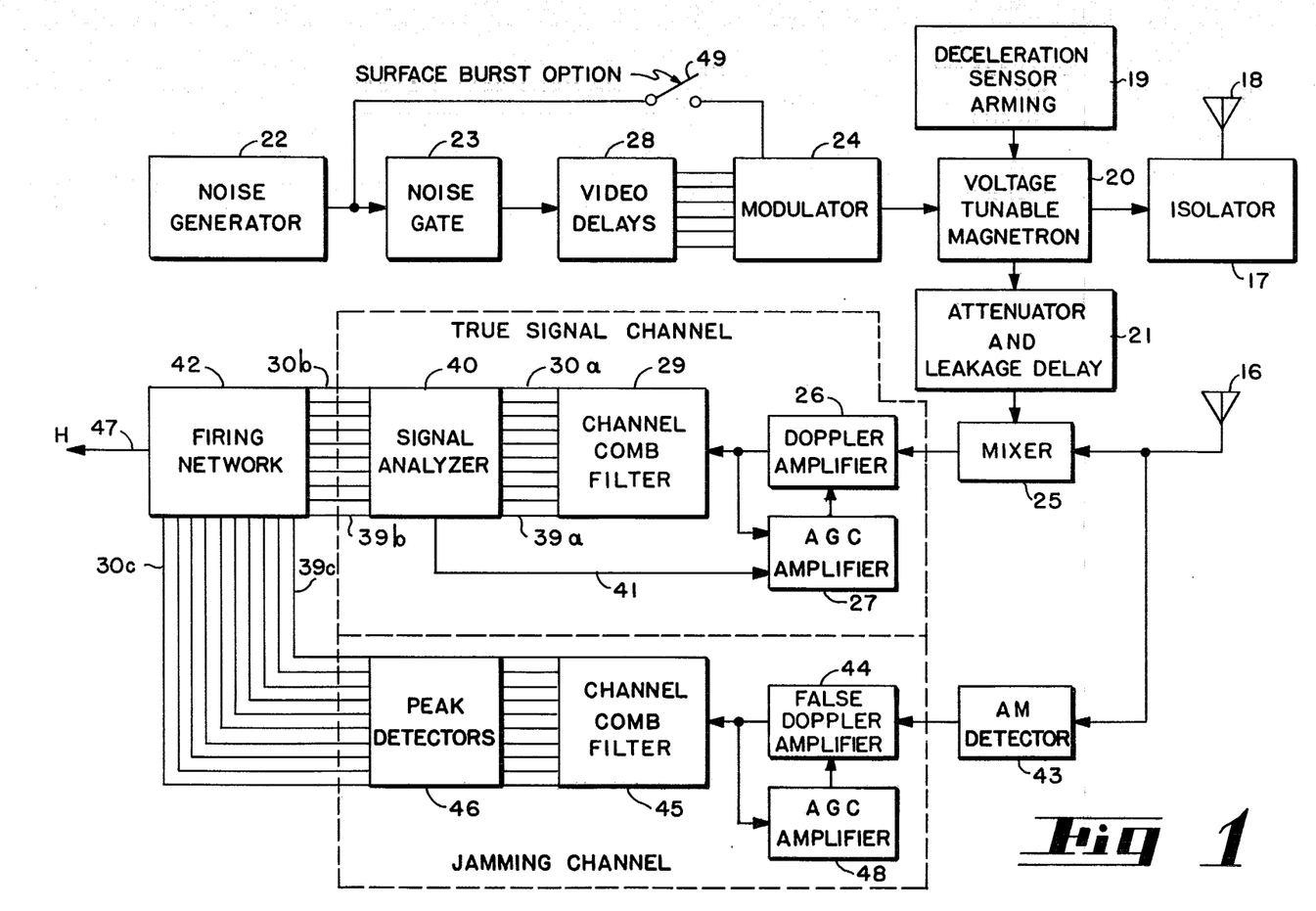
FIG. 1 is a circuit schematic, generally in block form, of a radar fuzing system in accordance with the invention.

The invention provides (FIG. 1), in a target-approaching doppler radar of the type including means 20, 21 for generating radio frequency signals and supplying local oscillations, means 22, 23 for generating bursts of random noise, modulator means 24, means 25 for mixing said local oscillations with echo signals, a doppler amplifying channel 26, and means 27 for controlling the sensitivity of said channel, the improvement which comprises, in combination:

a video delay network 28 interposed between the noise burst signal generating means 22, 23 and the modulator means 24 for effectively forming each burst into a sequence of bursts of like character (such as A, A, A, A, A, A, FIG. 2, graph a) and the successive bursts into successive sequences (such as the A sequence and the B sequence, FIG. 2, graph a), thereby providing several opportunities for correlation at radio frequencies;

and means for taking advantage of a later opportunity for correlation if at any point in the approach to the target barrage-type false jamming signals are present, the last-mentioned means comprising:

filter means 29 in the doppler signal amplifying chain for dividing the doppler signal spectrum down into a plurality of segments (symbolized by lines 30a–39a, FIG. 1) large in number with respect to the number of adjacent segments (preferably two) into which a true doppler signal falls;

and signal analyzer means 40 having a light plurality of inputs coupled to said filter means, said signal analyzer means being arranged to determine whether signals applied to it are true doppler signals falling within said small number of segments or barrage-type false jamming signals spanning a larger number, and said signal analyzer including signal outputs and also a decision output 41 coupled to said doppler-channel sensitivity control means 27 whereby to cause the control means to desensitize the doppler amplifying channel in the event that the signal analyzer means 40 decides that a jamming signal is present.

The invention further comprises:

a multi-segment firing network 42 coupled to the signal output of said signal analyzer means, said firing network having a plurality of firing circuits;

and false signal translating means responsive to the presence of false amplitude modulation jamming signals within any or all segments of the doppler spectrum for disabling the corresponding firing circuit or circuits, the last-mentioned means comprising:

a false signal receiving channel consisting of detecting means 43, another doppler amplifier means 44 coupled to the detecting means, another filter means 45 coupled to the last-mentioned doppler amplifier means for breaking the doppler spectrum down into a like plurality of segments, and means 46 having a plurality of outputs individually coupled to the firing circuits and inputs coupled to the filter means and responsive to a false signal in any or all of the last-mentioned filter segments for desensitizing the corresponding firing circuits.

For a better understanding of the present invention, together with other and further objects, advantages, and capabilities thereof, reference is made to the following description of the appended drawings, in which.

It is known to the art that random noise modulation may be employed to derive target echo intelligence while to a considerable extent frustrating jamming efforts. Correlation between the transmitted and received signals occurs over a vary narrow range, defined largely by the frequency and amplitude characteristics of the noise modulation. Radio frequency signal delay is conventionally used to establish maximum correlation at the prescribed burst height, but delays of this character cause excessive attenuation at considerable burst heights. Therefore the system now described utilizes video delay rather than radio frequency delay.

The present invention, more specifically, is an improved frequency modulated-noise correlation fuzing system. The unique correlation characteristics of random noise are exploited to provide performance reliability of a new order of magnitude. The invention exploits multiple correlation to establish a plurality of opportunities for air burst operation.

The invention is premised on the realistic hypothesis of unlikelihood that enemy jamming can follow the missile all the way to impact. In a system in accordance with the invention the failure of the fuze to function when a given correlation altitude is reached in nowise militates against its capability of functioning when the next correlation altitude is reached. The probability of enemy countermeasures being effective throughout the successive attainments of a plurality of correlation altitudes is remote. In addition to the multiple air burst characteristics of the improved system herein shown, firing is further assured by providing standby surface burst capability.

In the preferred embodiment herein shown, a frequency modulated transmitter (FIG. 1) operating in the L band is used, and the advantages of a voltage tunable magnetron 20 are exploited. Continuous random white Gaussian noise is generated by the noise generator 22. Included in the noise generator 22 is a band-pass voltage amplifier, and a noise spectrum of, say, 0.5 magacycles to 2 megacycles is accommodated.

Figure 7:
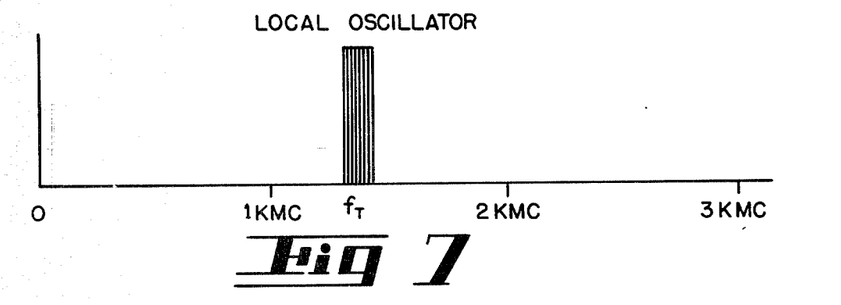
FIG. 7 is an amplitude-frequency graph of the local oscillations.

The magnetron 20 transmits a frequency-modulated radio frequency signal having a center frequency approximating 1500 megacycles (FIG. 7). Upon application of the noise voltages, the magnetron oscillator frequency is deviated at the noise rate. The root means square deviation is approximately 50 megacycles in the illustrative embodiment herein shown, so that the root means square bandwidth of the radiated signals approximates 100 megacycles. Parenthetically, it will be understood that all parameters herein mentioned or discussed are provided by way of illustration and not of limitation.

The wide transmitted spectrum in and of itself tends to frustrate adversary countermeasures. In accordance with the invention, the random noise (from 22, 23, FIG. 1) is applied to the transmitter in a unique sequence so that multiple correlations occur (FIG. 2) when the transmitted and received signals are mixed. These multiple correlations permit firing to occur at any one of six prescribed altitudes. Again, this figure is illustrative. When correlation occurs, the difference frequency is to doppler component created by the missile closure velocity.

Figure 6:
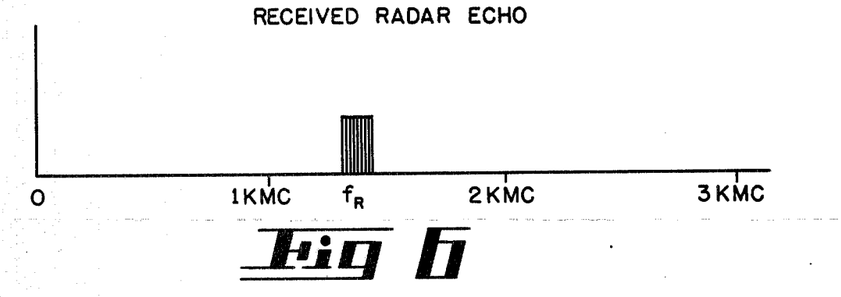
FIG. 6 is an amplitude-frequency graph of a typical echo signal.
Figure 9:
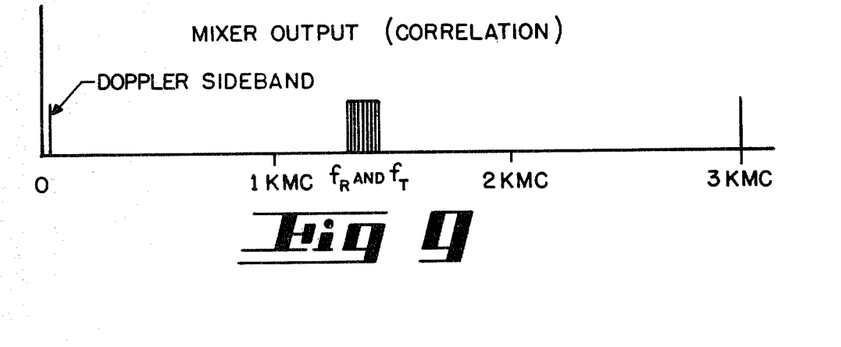
FIG. 9 is an amplitude-frequency graph of the mixer output, with correlation.

The theory of noise correlation fuzing is well established in the art and is therefore viewed only summarily here. It will be postulated that a transmitter is frequency-modulated with random noise and radiates a signal which is reflected from a target and returned to a receiving antenna. It is further assumed that the radiated signal is also fed through an attenuating delay line (21, FIG. 1) to a mixer or correlator 25, where it is combined with the echo signal. The echo signal has the amplitude-frequency characteristic illustrated in FIG. 6. Over a narrow range, when the spacial delay or signal path approaches the radio frequency delay closely, correlation will be achieved and the output of the mixer will be a doppler frequency signal having characteristics usable for firing (see doppler side band, FIG. 9). While prior art systems proposed one delay time and therefore one opportunity for correlation, the improved system herein shown features multiple delays (see 28, FIG. 1). The end result is that, if enemy countermeasures preclude firing at the upper altitude for correlation, then five additional opportunities (FIG. 2) will exist for firing, and as those opportunities arise the effectiveness of adversary countermeasures progressively decreases.

In FIG. 1 there is shown a target-approaching doppler radar in accordance with the invention.

A conventional deceleration sensing device 19 initiates the arming of the fuze. Radio frequency transmitter power is provided by a voltage tunable magnetron 20, operating at a frequency (say 1500 megacycles) appropriate for magnetron usage with a low wattage output. The magnetron is coupled to the transmitting antenna 18 via a suitable isolator 17, which, as the art knows, prevents reflections, due to mismatching of the antenna, and inhibits jamming signal interference with the frequency of the magnetron. The modulation signals originate in a noise generator 22, the output of which is coupled to the input of a noise gate 23, which is coupled to the modulating device 24 by a network herein arbitrarily referrred to by the expression "video delays" and designated by the reference numeral 28 in FIG. 1. This network is hereinafter described in detail.

Figure 3:
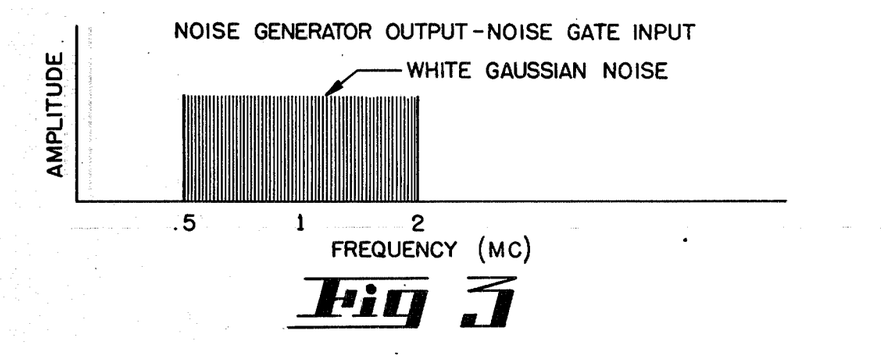
FIG. 3 is an amplitude-frequency graph of the noise generator output.
Figure 4:
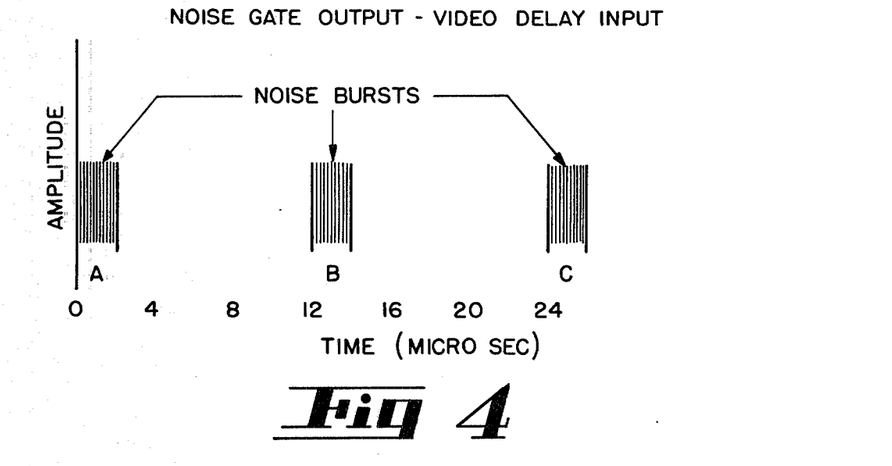
FIG. 4 is an amplitude-time graph of the noise gate output.

The magnetron 20 is voltage-modulated by the modulating device 24 with a noise band of, say, 0.5 to 2 megacycles as determined by the noise generator 22. For a purpose presently to be described, the output from the noise generator 22 (FIG. 3) is chopped by the gating device 23 into bursts (FIG. 4), each of approximately 2 microseconds' duration and spaced at 12 microsecond intervals. This gating device, as is conventional, will be understood to be provided with a suitable gating signal input, clocked to meet the requirements of time and spacing.

It will be understood that the elements 20 and 21 constitute means for generating radio frequency signals and supplying local oscillations, the elements 22 and 23 constitute means for generating bursts of random noise, the element 24 is a modulator, the mixer 25 is the means for mixing local oscillations with echo signals, and further that the receiver includes a doppler amplifying channel 26 and gain control means 27 for controlling the sensitivity of that channel.

Figure 2:
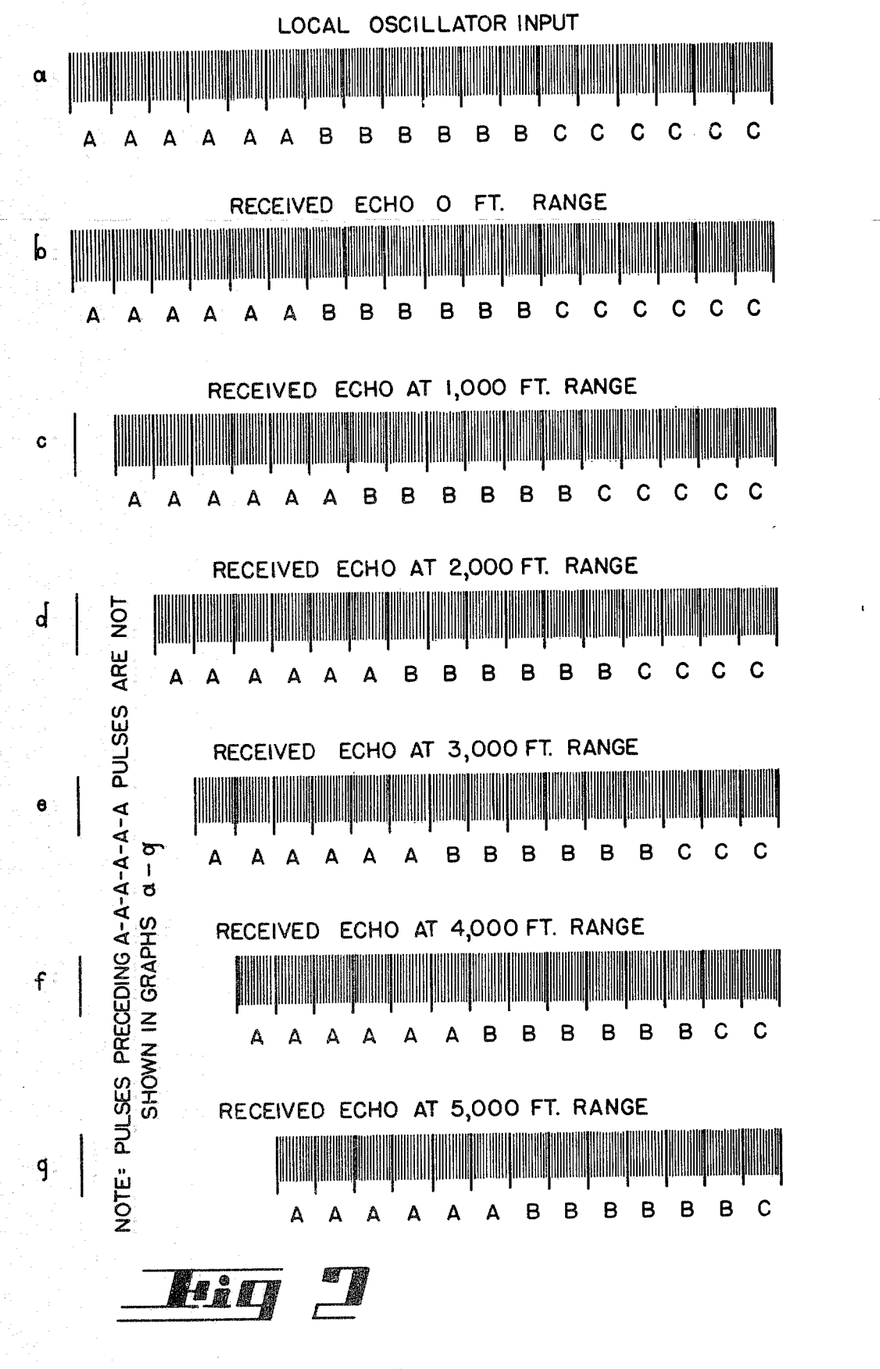
FIG. 2 is a set of graphs lettered a–g, inclusive, used as an aid in explaining how the improved radar fuzing system provides opportunities to correlate at various altitudes.
Figure 5:
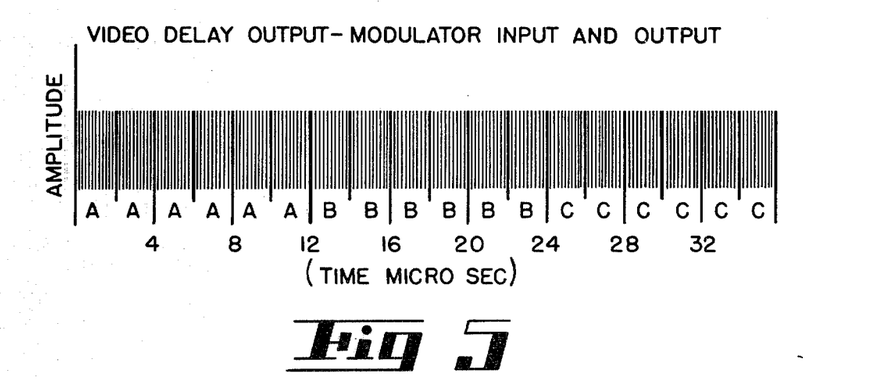
FIG. 5 is an amplitude-time graph of the video delay network output.

The 12 microsecond interval mentioned above establishes a basic time base cycle. That is to say, if the successive noise bursts be designated by the letters A, B, and C (FIG. 4), the leading edges of bursts A, B, and C are 12 microseconds apart. The output of the noise gate 23 is coupled to the input of a video delay network 28 which consists of a buffer amplifier input stage and a delay line network. This delay line network may comprise either six video delay lines or one video delay line with six output taps, providing delays of 2, 4, 6, 8, 10, and 12 microseconds. The output of each delay line or each tap is fed into a buffer amplifier contained in unit 28, and the six buffer amplifiers are connected in parallel and coupled to the modulator 24. Therefore the video delay network delivers continuous noise to the modulator. That is, the signal applied to the modulator is continuous but has discrete characteristics. In other words, each time base cycle of 12 microseconds is composed of six identical noise segments, placed end to end. For example, the sequence of bursts A, A, A, A, A, A (FIGS. 2a and 5) lasts for 12 microseconds and is immediately followed by a sequence B, B, B, B, B, B (FIG. 5). At the end of 24 microseconds the sequence C, C, C, C, C then continues for 12 microseconds, for example.

The practicality of any noise modulated system is determined by the degree of correlation between the transmitted and received energy. In the system herein disclosed, the noise bursts that are applied to the transmitter during a single time base cycle (such as A, A, A, A, A, A, FIG. 5) are all exactly alike. This exactness is assured because the different video delay lines have identical frequency distortion characteristics. Since the six bursts that constitute a time base cycle are all the same, and also since these signals are applied to the magnetron 20 by the same modulator 24, the magnetron will transmit signals having the same noise spectrum six times in each time base cycle. Thus, the magnetron voltage frequency characteristics need not be linear to achieve these six identical transmissions during one time base cycle. This assures that the transmit and receive waveforms will correlate in six distinct and different positions in time.

FIG. 2 shows that the sixth burst of a signal time base cycle will correlate with the first burst of the received echo at 5000 feet (graph g). It is further illustrated that the fifth and sixth bursts will correlate with the first and second bursts at 4000 feet (graph f). A similar explanation for the 3000, 2000, and 1000 foot ranges is implied (graphs e, d, and c, respectively). At ground zero or zero range, the entire transmitted spectrum will correlate (graph b). Since partial correlation will occur previous to ground zero, low altitude detection is assured. This noise correlation system will define six separate altitudes at which fuzing capability does occur. During correlation, a simple increase in the output level of the mixer would occur if the received echo were identical to the transmitted signal. However, the received echo has been increased in frequency by an amount equal to the doppler frequency. Therefore, a signal at the doppler frequency will be present (FIGS. 12 and 9) as the result of the mixing of the transmitted signal and the received echo.

The invention therefore includes a video delay network 28 interposed between the noise burst signal generating means 22, 23 and the modulator means 24 for effectively forming each burst into a sequence of bursts of like character (such as A, A, A, A, A, A, FIG. 2, curve a) and the successive bursts into successive sequences, thereby providing several opportunities for correlation at radio frequencies.

The received echo signal is intercepted by a receiving antenna 16 and applied to the mixer 25, whereat it is combined with an attenuated and delayed portion of the modulated output from the magnetron 20. For this purpose the input of mixer 25 and an output of magnetron 20 are intercoupled by an attenuator and leakage delay network 21, the function of which is effectively to provide a local oscillator signal for the mixer 25. The transmitted carrier is attenuated to a low level and delayed so that the leakage path between transmit and receive antennas 18 and 16 is identical in characteristics to the path through the attenuator network 21. This arrangement minimizes noise caused by mixing of leakage by-pass signals and local oscillator signals.

The output of mixer 25, constituting the sum and difference frequencies between the radar echo and the local oscillator input is applied to a doppler amplifier 26. Preferably the mixer 25 is a balanced type, so that noise is minimized. The input of doppler amplifier 26 incorporates an integrator for the elimination of signals (see FIGS. 10 and 11) having frequencies above the expected doppler spectrum. The integrator bandpass is between 10,329 and 4500 cycles, for example, and a voltage gain figure of 95.2 db for the amplifier 26 is suitable.

In order to preclude saturation and clipping, and for another purpose described later herein, automatic gain control is provided by an AGC amplifier 27. This AGC network 27 controls the gain of the doppler amplifier 26 between the gain limits of 42.2 and 95.2 db. This circuit 27 has two inputs. The input from the doppler amplifier 26 is amplitude-detected, amplified, and finally applied as a feedback signal back to the doppler amplifier 26. This will prevent the doppler amplifier 26 from saturating within the gain limits specified above. A second signal which is the sum of the outputs of a comb filter 29 will come from a diode matrix in the signal analyzer 40 (see line 41, FIG. 1). The summed input from the diode matrix will control the gain of the doppler amplifier 26 so that a firing signal cannot be developed if there is an output from more than two adjacent filter segments in unit 29.

It will be understood that the doppler amplifier signal from unit 26 is amplified and processed by filter 29 and analyzer 40 and applied to a multi-segment firing network 42, which produces a firing impulse on output line 47 when the received doppler signal reaches a predetermined amplitude threshold. Accordingly, the amplifier 26 is proportioned to amplify only the limited band of doppler frequencies expected for the range of closing velocities. The rationale behind the use of automatic gain control in the true signal channel (FIG. 1) including the doppler amplifier 26 is to preclude saturation by large returns and jamming.

The invention therefore further comprises means for taking advantage of a later opportunity for correlation as to any point in the approach to the target when barrage-type false jamming signals are present, foreclosing a particular opportunity. This means comprises the filter means 29 and the signal-analyzer means 40, as associated with the sensitivity control means 27. In accordance with the invention the pass band of the amplifying system is divided into ten equal segments (symbolized by lines 30a–39a) by the comb filter 29. This comb filter 29 is so proportioned that a single doppler frequency can fall within not more than two adjacent segments of the comb filter. That is, the filter means 29 divides the doppler signal spectrum down into ten segments, which number of ten is large with respect to the number of adjacent segments (i.e., two) into which a true doppler signal falls. The signal analyzer or diode matrix 40 has ten inputs coupled to the ten outputs of the comb filter for the purpose of deciding whether the fuze has received a true firing signal or a jamming signal. Under barrage jamming all segments of unit 29 deliver an output to the diode matrix 40. These distinct characteristics of a jamming signal and a true "fire" signal permit the matrix or signal analyzer 40 to decide which condition exists, and, in the event of a jamming signal, to produce a signal on line 41 which, as applied to AGC amplifier 27, reduces the gain of the doppler amplifying system 26 and causes full desensitization.

By way of example, the ten filter segments of the comb filter 29 start at 4192 cycles and extend to 10,695 cycles in approximately 650 cycle increments. The filter 29 therefore separates the output of the doppler amplifying system into ten equal and overlapping portions of the doppler spectrum. The frequency response of any individual segment is selected such that any discrete frequency within the expected doppler spectrum can fall in no more than two filter segments. This specifies that a true "fire" signal will cause an output to exist in no more than two adjacent filter segments.

By way of example, the signal analyzer 40 has ten signal outputs 30b–39b coupled to corresponding inputs of a multi-segment firing network 42 which, upon reception of a true firing signal, delivers sufficient energy via line 47 to cause warhead initiation. Each of the ten discrete firing channels of unit 42 is therefore coupled to its respective segment of the signal analyzer 40. If the summed output of diode matrix or analyzer 40 has a larger output than can be expected from any two adjacent channels, then barrage jamming is detected and the sensitivity of all firing circuit channels is decreased, by reason of the decrease in the gain of amplifier system 26.

It will be seen from the foregoing that the signal analyzer 40 includes a decision output 41 coupled to the doppler channel sensitivity control means 27, thereby to cause the control means to desensitize the doppler amplifying channel in the event that the signal analyzer means 40 decides that a jamming signal is present.

The system so far described is, however, still suceptible to jamming by amplitude-modulated continuous waves which produce a simulated "fire" signal. For example, if jamming comprises a center frequency and two doppler side bands, the result is the appearance of a true "fire" signal. Accordingly, the invention provides another receiving channel, referred to as a false signal channel, in order to render ineffective this type of jamming. The false signal channel comprises an amplitude modulation detector 43, coupled to receiving antenna 16, and other cascaded elements corresponding to the units 26 and 29 and numbered 44 and 45, respectively. This false signal channel is insensitive to all signals other than amplitude-modulated signals within the doppler frequency range. Therefore, any signal output from the amplitude modulation detector 43 results from the presence of jamming of the type indicated.

The output of the amplitude modulation detector 43 is the false signal channel is coupled to a false doppler amplifier 44, which in turn is coupled to a ten-segment comb filter 45. The false doppler amplifier 44 is controlled by automatic gain control amplifier 48. Each of the ten comb filter segments is coupled to its respective one of ten peak detectors included in a unit 46, and the peak detector outputs are in turn separately coupled to the firing network 42 by channels, in such a manner that if any one of the ten peak detectors in unit 46 indicates that an amplitude-modulated jamming signal is presented, then the corresponding channel in the firing network 42 is desensitized so that the warhead cannot be fired.

A surface burst option is provided by closing the normally open switch 49 between noise generator 22 and modulator 24. When switch 49 is closed the noise generator is coupled directly to the modulator and the noise gate 23 and video delays are eliminated from the active circuitry, so that the fuze functions as a conventional noise correlation, surface burst fuze. The expression "surface burst" is well known in the art and it implies that detonation occurs in the air but in close proximity to a target.

The false doppler amplifier 44, automatic gain control amplifier 48, and comb filter 45 of the false signal channel are substantially identical to those in the true signal channel.

The respective comb filter segments of unit 45 in the false signal channel are connected to the corresponding firing circuits in network 42 through the peak detectors in unit 46, the function of the peak detector outputs 30c–39c being to control the sensitivity of their respective channels in unit 42. Therefore the desensitizing of the ten firing circuits in unit 42 may be caused by two means: collectively by the diode matrix summation control from signal analyzer 40, and individually by the peak detector control from the unit 46.

Therefore it will be seen that the invention further comprises:

a multi-segment firing network 42 coupled to the signal output of said signal analyzer means, said firing network having a plurality of firing circuits;

false signal translating means responsive to the presence of false amplitude modulation jamming signals within any or all segments of the doppler spectrum for disabling the corresponding firing circuit or circuits, the last-mentioned means comprising:

a false signal receiving channel consisting of detecting means 43;

another doppler amplifier means 44 coupled to the detecting means, the last-mentioned doppler amplifier means being a false signal doppler amplifier means;

another filter means 45 coupled to the last-mentioned doppler amplifier means for breaking the doppler spectrum down into a like plurality of segments;

and means 46 having a plurality of outputs individually coupled to the firing circuits and inputs coupled to the filter means and responsive to a false signal in any or all of the last-mentioned filter segments for desensitizing the corresponding firing circuits.

It has been stated that the delay lines 28 provide delays of 2, 4, 6, 8, 10, and 12 microseconds. The six delay line outputs are recombined and applied to the modulator input. From this it will be seen that the character of the continuous noise input to the modulator will be six consecutive bursts of noise (A, A, A, A, A, A, FIG. 5) all identical to each other. This is followed by six more bursts (B, B, B, B, B, B, FIG. 5). However, no set of six noise bursts bears any relation to any other set of six bursts. Although the transmitted signal has a 12-microsecond periodicity, this is of no help to the enemy because none of the 12-microsecond periods can mutually correlate.

Figure 8:
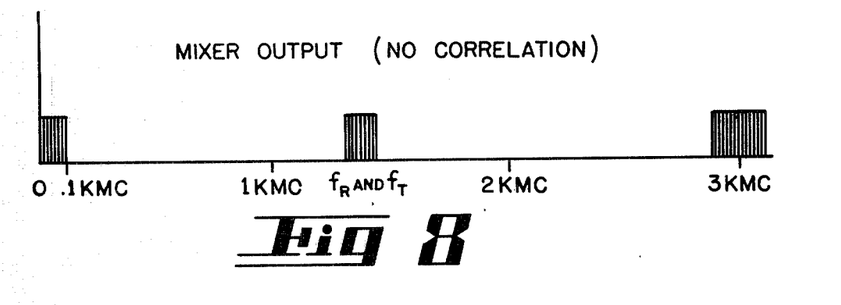
FIG. 8 is an amplitude-frequency graph of the mixer output, with no correlation.
Figure 10:
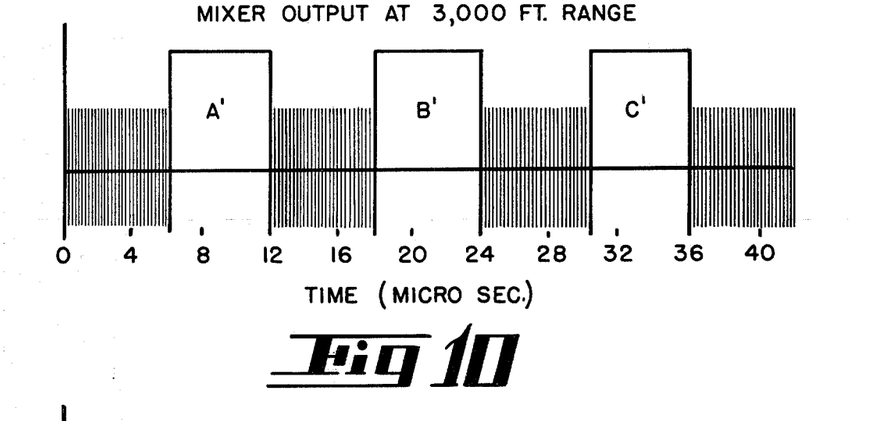
FIG. 10 is an amplitude-time graph of the mixer output at a range of 3000 feet.
Figure 11:
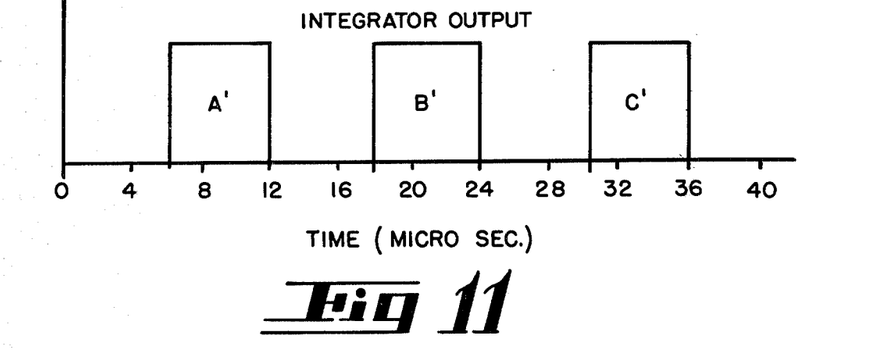
FIG. 11 is an amplitude-time graph of the integrator output—i.e., the output of the integrator following the mixer.
Figure 12:
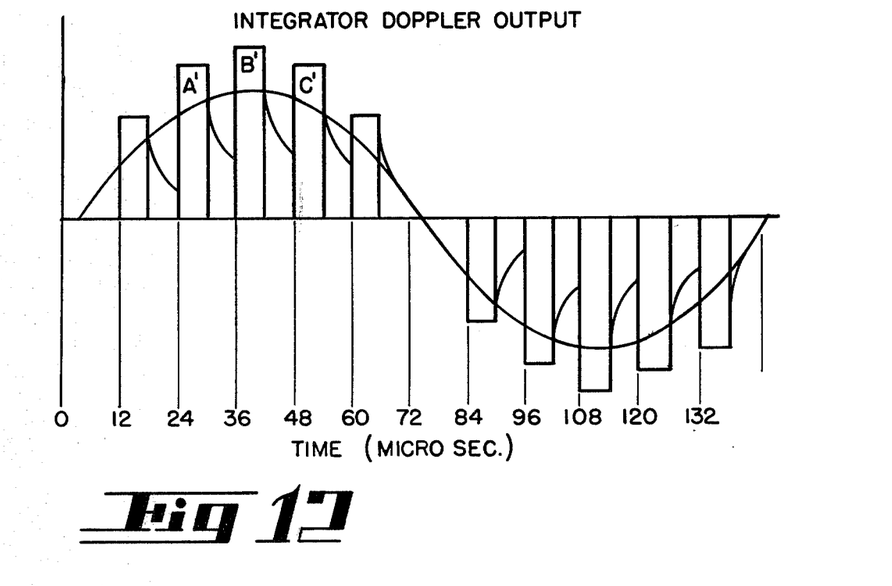
FIG. 12 is an amplitude-time graph of the output of the doppler amplifier.
Figure 13:
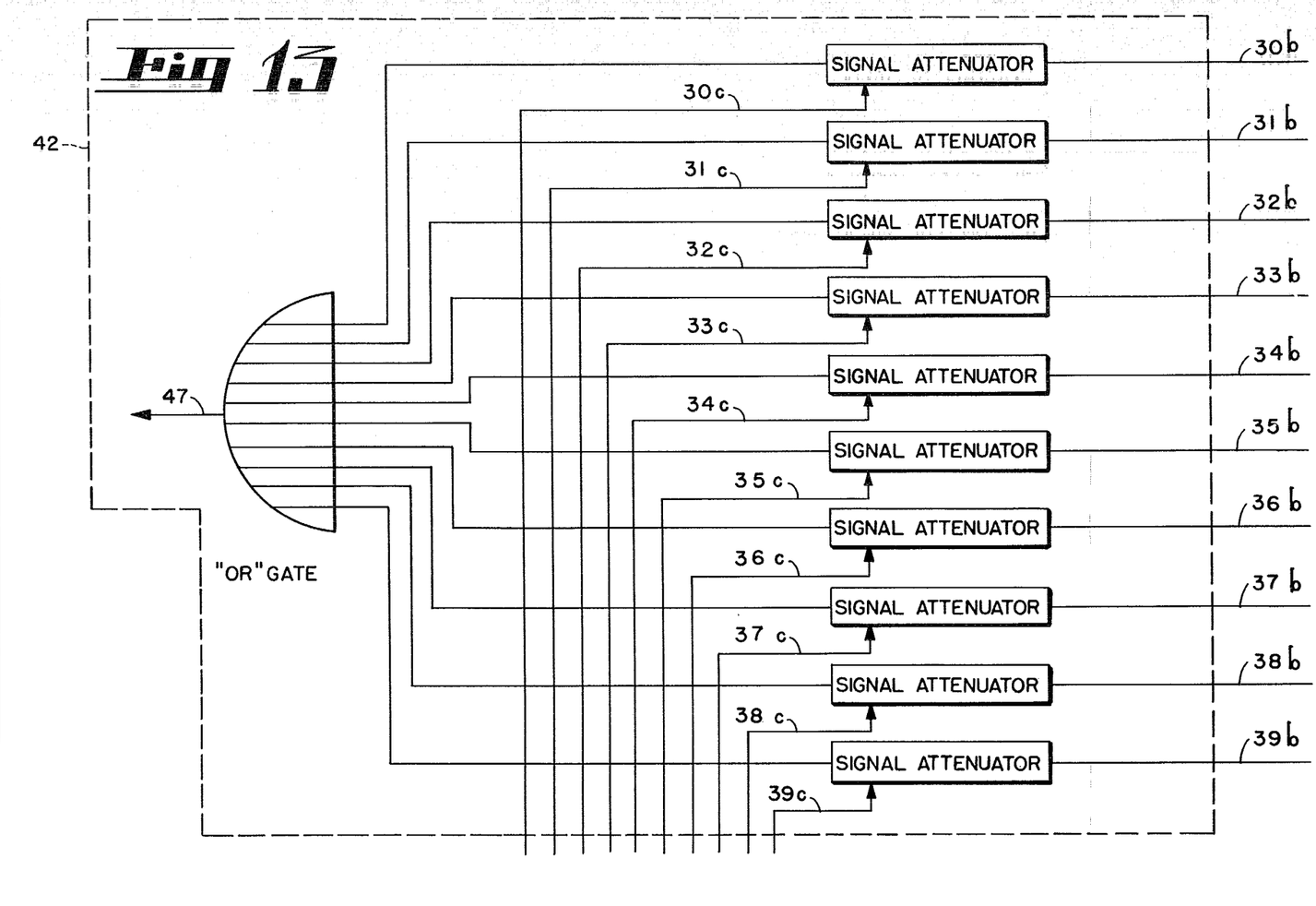
FIG. 13 which is a block diagram of a suitable firing network for incorporation in the invention.

When the missile is at 3000 feet altitude, say, the first three 2-microsecond noise bursts received in any given 12-microsecond period will directly correlate with the last three 2-microsecond noise bursts transmitted during that period (graphs e and a, FIG. 2). At all other times the mixer output is only broad band noise (FIG. 8), because it is attempting to correlate between two unrelated periods. Thus, the mixer output will consist of trains of three adjacent 2-microsecond pulses, said trains being spaced at 12-microsecond intervals (FIGS. 10 and 11). These pulses will increase and decrease in successive position and negative directions in accordance with the doppler envelope. By integrating these pulses (filtering) the doppler signal is defined and amplified by the doppler amplifier 26 (FIG. 12).

At 4000 feet the correlation overlap will be 4 microseconds out of each 12-microsecond period. An increase in correlation overlap will occur every 1000 feet to zero altitude. At zero altitude the overlap will be 100% (graphs a and b, FIG. 2), and the system will function in the same manner as conventional noise correlation systems.

While there has been shown and described what is at present considered to be the preferred embodiment of the invention, it will be obvious to those skilled in the art that various modifications and changes may be made therein without departing from the scope of the invention as defined by the appended claims.

We claim:

1. In a target-approaching doppler radar of the type including means for generating radio frequency signals and supplying local oscillations, means for generating random noise bursts, modulator means, means for mixing said local oscillations with echo signals, a doppler amplifying channel, and means for controlling the sensitivity of said channel, the improvement which comprises, in combination:

a video delay network interposed between the noise burst signal generating means and the modulator means for effectively forming each burst into a sequence of bursts of like character and the successive bursts into successive sequences, thereby providing several opportunities for correlation at radio frequencies;

and means for taking advantage of a later opportunity for correlation if at any point in the approach to the target barrage-type false jamming signals are prsent, the last-mentioned means comprising:

filter means in the doppler signal amplifying channel for dividing the doppler signal spectrum down into a plurality of segments large in number with respect to the number of adjacent segments into which a true doppler signal falls;

and signal analyzer means having a like plurality of inputs coupled to said filter means, said signal analyzer means being formed to determine whether signals applied to it are true doppler signals falling within said small number of segments or barrage-type false jamming signals spanning a larger number, and said signal analyzer including an output coupled to said doppler-channel sensitivity control means whereby to cause the control means to desensitize the doppler amplifying channel in the event that the signal analyzer decides that a jamming signal is present.

2. In a target-approaching doppler radar of the type including means for generating radio frequency signals and supplying local oscillations, means for generating random noise bursts, modulator means, means for mixing said local oscillations with echo signals, a doppler amplifying channel, and means for controlling the sensitivity of said channel, the improvement which comprises, in combination:

a video display network interposed between the noise burst signal generating means and the modulator means for effectively forming each burst into a sequence of bursts of like character and the successive bursts into successive sequences, thereby providing several opportunities for correlation at radio frequencies;

and means for taking advantage of a later opportunity for correlation if at any point in the approach to the target barrage-type false jamming signals are present, the last-mentioned means comprising:

filter means in the doppler signal amplifying channel for dividing the doppler signal spectrum down into a plurality of segments large in number with respect to the number of adjacent segments into which a true doppler signal falls;

signal analyzer means having signal outputs and a like plurality of inputs coupled to said filter means, said signal analyzer being formed to determine whether signals applied to it are true doppler signals falling within said small number of segmentsor barrage-type false jamming signals spanning a larger number, and said signal analyzer including an output coupled to said doppler-channel sensitivity control means whereby to cause the control means to desensitize the doppler amplifying channel in the event that the signal analyzer decides that a jamming signal is present;

a multi-segment firing network coupled to the signal output of said signal analyzer means, said firing network having a plurality of firing circuits;

and false signal translating means responsive to the presence of false amplitude modulation jamming signals within any or all segments of the doppler spectrum for disabling the corresponding firing circuit or circuits, the last-mentioned means comprising:

a false signal receiving channel consisting of detecting means, another doppler amplifier means coupled to the detecting means, another filter means coupled to the last-mentioned doppler amplifier means for breaking the doppler spectrum down into a like plurality of segments, and means having a plurality of outputs individually coupled to the firing circuits and inputs coupled to the filter means and responsive to a false signal in any or all of the last-mentioned filter segments for desensitizing the corresponding firing circuits.

3. In a target-approaching doppler radar of the type which is modulated by noise bursts and includes a doppler amplifying channel and means for controlling the sensitivity of said channel, the improvement which comprises, in combination:

means for effectively forming each burst into a sequence of bursts of like character and the successive bursts into successive sequences, thereby providing several opportunities for correlation at radio frequencies;

and means for taking advantage of a later opportunity for correlation if at any point in the approach to the target barrage-type false jamming signals are present, the last-mentioned means comprising decision means cascaded with the doppler signal amplifying channel for determining whether signals applied to it are true doppler signals or barrage-type false jamming signals, said decision means including an output coupled to said doppler-channel sensitivity control means whereby to cause the control means to desensitize the doppler amplifying channel in the event that the decision means determines that a jamming signal is present.

4. In a target-approaching doppler radar of the type which is modulated by noise bursts and includes a doppler amplifying channel and means for controlling the sensitivity of said channel, the improvement which comprises, in combination:

means for effectively forming each burst into a sequence of bursts of like character and the successive bursts into successive sequences, thereby providing several opportunities for correlation at radio frequencies;

means for taking advantage of a later opportunity for correlation if at any point in the approach to the target barrage-type false jamming signals are present, the last-mentioned means comprising means for dividing the doppler signal spectrum into a plurality of segments;

and decision means cascaded with said segments for determining whether signals applied to it are true doppler signals or barrage-type false jamming signals, said decision means including an output coupled to said doppler amplifying channel sensitivity control means whereby to cause the control means to desensitize the doppler amplifying channel in the event that the decision means determines that a jamming signal is present.

5. In a target-approaching doppler radar of the type which is modulated by noise bursts and includes a receiver having a doppler amplifying channel and means for disabling said receiver, the improvement which comprises, in combination:

means for effectively forming each burst into a sequence of bursts of like character and the successive bursts into successive sequences, thereby providing several opportunities for correlation at radio frequencies;

means for taking advantage of a later opportunity for correlation if at any point in the approach to the target barrage-type false jamming signals are present, the last-mentioned means comprising means for dividing the doppler signal spectrum into a plurality of segments;

decision means cascaded with said segments for determining whether signals applied to it are true doppler signals or barrage-type false jamming signals, said decision means including an output coupled to said doppler amplifying channel disabling means to cause it to disable the receiver in the event that the decision means determines that a jamming signal is present;

and a plurality of firing circuits in cascade with said decision means and false signal translating means responsive to the presence of false amplitude modulation jamming signals within any or all segments of the doppler spectrum for disabling the corresponding firing circuit or circuits.

6. The combination in accordance with claim 5 in which the false signal translating means comprises:

means for breaking the doppler spectrum down into a like plurality of segments, and means coupled to the last-mentioned means and responsive to a false signal in any of said segments for disabling the corresponding firing circuits.

7. In a target-approaching doppler radar of the type which is modulated by noise bursts and includes a receiver having a doppler amplifying channel and means for disabling said receiver, the improvement which comprises, in combination:

means for effectively forming each burst into a sequence of bursts of like character and the successive bursts into successive sequences, thereby providing several opportunities for correlation at radio frequencies;

means for taking advantage of a later opportunity for correlation it at any point in the approach to the target barrage-type false jamming signals are present, the last-mentioned means comprising means for dividing the doppler signal spectrum into a plurality of segments;

and decision means cascaded with said segments for determining whether signals applied to it are true doppler signals or barrage-type false jamming signals, said decision means including an output coupled to said doppler disabling means to cause it to disable the receiver in the event that the decision means determines that a jamming signal is present.

8. The method of doppler radar signaling which comprises the steps of generating bursts, forming each burst into a sequence of bursts of like character and the successive bursts into successive sequences to provide several opportunities for correlation, modulating said successive sequences onto a carrier, receiving echo signals, intermodulating the echo signals and the modulated carrier, translating the products of intermodulation, discriminating between true doppler signals and barrage-type false jamming signals in said products during any opportunity for correlation, and utilizing the false signals to decrease the product-translation in the presence of false signals, so that a later opportunity for correlation may be utilized.

9. The method of doppler radar signaling which comprises the steps of generating noise bursts, forming each burst into a sequence of bursts of like character and the successive bursts into successive sequences to provide several opportunities for correlation, modulating said successive sequences onto a carrier, radiating the modulated carrier, receiving echo signals, intermodulating the echo signals and the modulated carrier, amplifying the products of intermodulation, discriminating between true doppler signals and barrage-type false jamming signals in said products during any opportunity for correlation, and utilizing the false signals to decrease the amplification in the presence of false signals, so that a later opportunity for correlation may be utilized.

10. The method of doppler radar signaling which comprises the steps of generating bursts, forming each burst into a sequence of bursts of like character and the successive bursts into successive sequences to provide several opportunities for correlation, utilizing said successive sequences to frequency-modulate a carrier, radiating the modulated carrier, receiving echo signals, intermodulating the echo signals and the modulated carrier, amplifying the products of intermodulation, discriminating between true doppler signals and barrage-type false jamming signals in said products during any opportunity for correlation, and utilizing the false signals to decrease the amplification in the presence of false signals, so that a later opportunity for correlation may be utilized.

11. The method of doppler radar signaling which comprises the steps of generating bursts of random noise, forming each burst of random noise into a sequence of bursts of like character and the successive bursts into successive sequences to provide several opportunities for correlation, utilizing said successive sequences to frequency-modulate a carrier, radiating the modulated carrier, receiving echo signals, intermodulating the echo signals and the modulated carrier, amplifying the products of intermodulation, discriminating between true doppler signals and barrage-type false jamming signals in said products during an opportunity for correlation, and utilizing the false signals to decrease the amplification in the presence of false signals, so that a later opportunity for correlation may be utilized.

12. The method of doppler radar signaling which comprises the steps of generating bursts of random noise, forming each burst of random noise into a sequence of bursts of like character and the successive bursts into successive sequences to provide several opportunities for correlation, utilizing said successive sequences to frequency-modulate a carrier, radiating the modulated carrier, receiving echo signals, intermodulating the echo signals and the modulated carrier, amplifying the products of intermodulation, comb-filtering the products of intermodulation into frequency segments, sensing a distinction between true doppler signals spanning a small number of segments and barrage-type false jamming signals spanning a large number of segments, and then utilizing the intelligence of the sensing to disable the reception until the false signals disappear.

13. The method of doppler radar signaling which comprises the steps of generating bursts of random noise, forming each burst of random noise into a sequence of bursts of like character and the successive bursts into successive sequences to provide several opportunities for correlation, utilizing said successive sequences to frequency-modulate a carrier, radiating the modulated carrier, receiving echo signals, intermodulating the echo signals and the modulated carrier, amplifying the products of intermodulation, comb-filtering the products of intermodulation into frequency segments, sensing a distinction between true doppler signals spanning a small number of segments and barrage-type false jamming signals spanning a large number of segments, utilizing the intelligence of the sensing to control the reduction of sensitivity of the reception of signals in all segments until the false signals disppear, detecting the presence of amplitude-modulation signals in any segment of the doppler spectrum, and finally utilizing the intelligence of the detecting to control the reduction of the sensitivity of reception of signals in that segment.

14. In a doppler radar of the type comprising means for transmitting radio frequency signals, means for generating modulation bursts of random noise, and modulator means, the improvement which comprises:
a video display network interposed between the noise burst signal generating means and the modulator means for effectively forming each burst into a sequence of bursts of like character and the successive bursts into successive sequences, thereby providing several opportunities for correlation at radio frequencies.

15. In a doppler radar receiver of the type comprising means for mixing local oscillations with echo signals, a doppler signal amplifying channel, and means for effectively disabling said channel, the improvement which comprises, in combination:
filter means in the doppler signal amplifying channel for dividing the doppler signal spectrum down into a plurality of segments large in number with respect to the number of adjacent segments into which a true doppler signal falls;
signal analyzer means having signal outputs and a like plurality of inputs coupled to said filter means, said signal analyzer means being formed to determine whether signals applied to it are true doppler signals falling within said small number of segments or barrage-type false jamming signals spanning a large number, and said signal analyzer including an output coupled to said doppler-channel disabling means whereby to cause the disabling means to disable the doppler amplifying channel in the event that the signal analyzer decides that a jamming signal is present;
a multi-segment firing network coupled to the signal outputs of said signal analyzer means, said firing network having a plurality of firing circuits;
and false signal translating means responsive to the presence of false amplitude modulation jamming signals within any or all segments of the doppler spectrum for disabling the corresponding firing circuit or circuits, the last-mentioned means comprising:
a false signal receiving channel consisting of detecting means, another doppler amplifier means coupled to the detecting means, another filter means coupled to the last-mentioned doppler amplifier means for breaking the doppler spectrum down into a like plurality of segments, and means having a plurality of outputs individually coupled to the firing circuits and inputs coupled to the filter means and responsive to a false signal in any or all of the last-mentioned filter segments for desensitizing the corresponding firing circuits.

* * * * *

UNITED STATES PATENT AND TRADEMARK OFFICE
CERTIFICATE OF CORRECTION

PATENT NO. : 4,158,842
DATED : June 19, 1979
INVENTOR(S) : John E. Clemens et al It is certified that error appears in the above-identified patent and that said Letters Patent are hereby corrected as shown below:

Column 1, line 44, please change "present" to ---presence---.

Column 3, line 35, please change "vary" to ---very---.

Column 4, line 1, please change "magacycles" to ---megacycles---.

Column 4, line 22, please change "to" to ---the---.

Column 5, line 61, please change "signal" to ---single---.

Column 6, line 55, please insert "input" before "signal".

Column 9, line 33, please change "position" to ---positive---.

Column 10, line 2, please change "prsent" to ---present---.

Column 10, line 30, please change "display" to ---delay---.

Column 12, line 48, please change "it" to ---if---.

Column 14, line 29, please change "display" to ---delay---.

Signed and Sealed this

Second Day of October 1979

[SEAL]

Attest:

RUTH C. MASON
Attesting Officer

LUTRELLE F. PARKER
Acting Commissioner of Patents and Trademarks